No. 613,306. Patented Nov. 1, 1898.
W. S. QUINBY.
MACHINE FOR FORMING PLASTIC MATERIALS.
(Application filed Mar. 14, 1898.)
(No Model.)
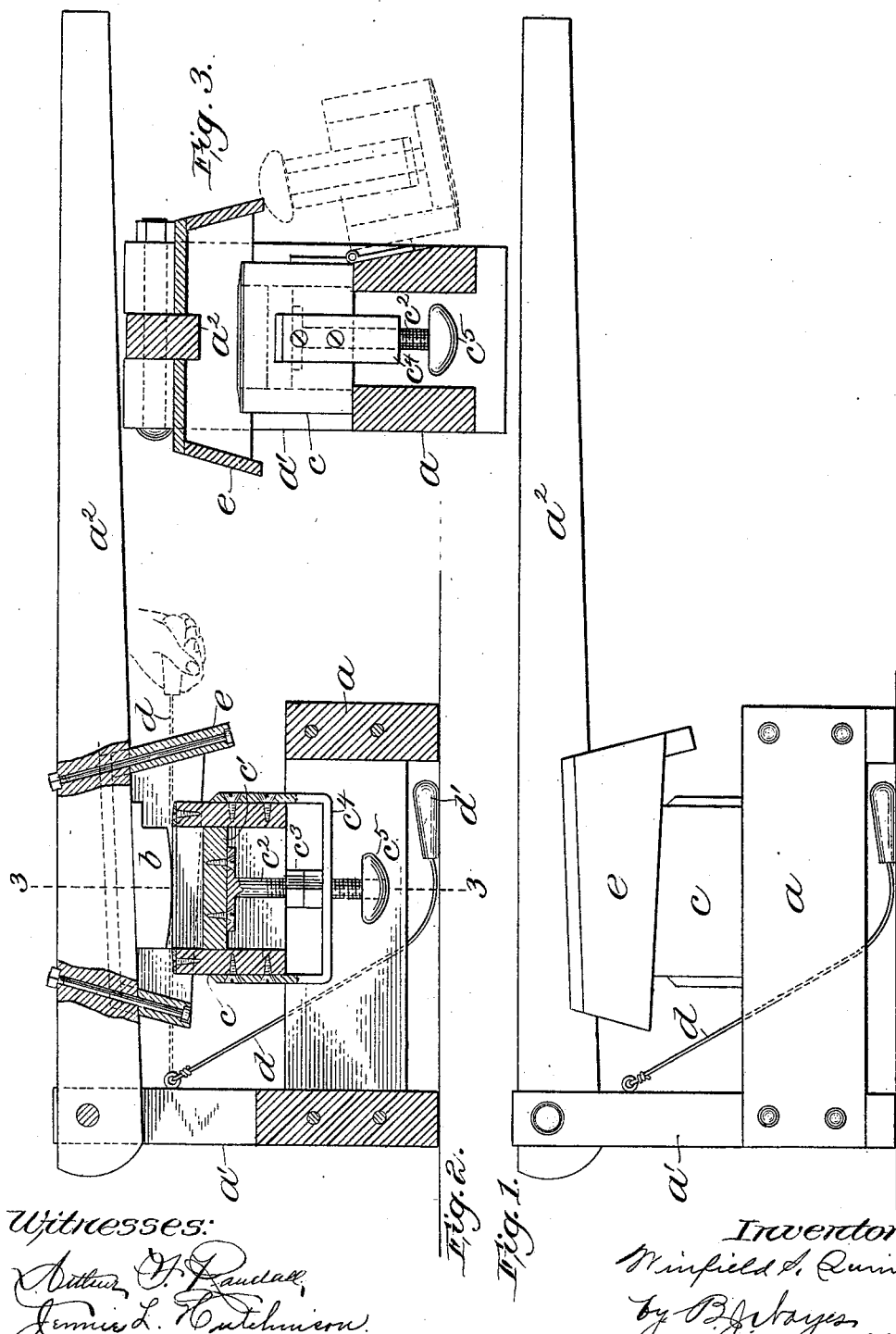

UNITED STATES PATENT OFFICE.

WINFIELD S. QUINBY, OF BROOKLINE, MASSACHUSETTS.

MACHINE FOR FORMING PLASTIC MATERIALS.

SPECIFICATION forming part of Letters Patent No. 613,306, dated November 1, 1898.

Application filed March 14, 1898. Serial No. 673,750. (No model.)

*To all whom it may concern:*

Be it known that I, WINFIELD S. QUINBY, of Brookline, county of Norfolk, State of Massachusetts, have invented an Improvement in Machines for Molding Plastic Materials, of which the following description, in connection with the accompanying drawings, is a specification, like letters on the drawings representing like parts.

This invention has for its object to improve the construction of machines for molding plastic materials—as, for instance, for forming butter into blocks having an imprint on one or both sides.

In accordance with this invention the mold in which the blocks are formed is pivoted at one side to the main frame or other support, so as to turn on a horizontal axis, thereby enabling its position to be reversed, said mold receiving the material composing the blocks when in one position and discharging the molded blocks when reversed or turned upside down. The mold has as a coöperative part of it a bottom plate which is constructed to slide bodily by gravity as the mold is turned on its pivotal connections, and when the mold is turned upside down said gravitating bottom plate serves as an automatic discharging device for discharging the molded blocks. A plunger of suitable shape to enter the mold is borne by a pivoted hand-lever, and a hood of suitable dimensions surrounds said plunger, which confines all flying particles. A wire is attached at one end to a fixed point beside the mold, which is made of suitable length to extend across the mold, and it is supplied at its outer or free end with a hand-piece, by which it may be manipulated. Said wire is provided for the purpose of cutting off the plastic material on a level with the top of the mold, and the surplus material thus cut off is removed by means of a paddle-like blade, and said wire is manipulated by holding it taut and sweeping it across the top of the mold.

Figure 1 shows in side elevation a machine embodying this invention for molding plastic materials; Fig. 2, a longitudinal vertical section of the machine shown in Fig. 1; and Fig. 3, a cross-section of the machine shown in Fig. 2, taken on the dotted lines 3 3.

The base $a$ is shaped to constitute the essential part of the main frame of the machine, and it has at one end an upright portion $a'$, to the upper end of which is pivoted a hand-lever $a^2$. The pivoted hand-lever bears upon its under side a plunger $b$, which is of suitable shape to enter a mold $c$, which is supported by the main frame beneath said hand-lever.

The mold $c$ consists of an open quadrangular frame having fitted within it a plate $c'$, which has fixed to its under side a screw-threaded rod $c^2$, having thereon a set-nut $c^3$, and said rod $c^2$ passes freely through a hole made in a yoke $c^4$, which is rigidly secured to said quadrangular frame, and the end of said rod $c^2$ which projects through said yoke has fixed upon it a weighted end piece $c^5$. The plate $c'$ is thus supported upon or by said rod $c^2$ and is free to slide bodily in the quadrangular frame of the mold by gravity. This plate $c'$ serves as the bottom plate for the mold, the space above it receiving the plastic material to be molded.

The mold $c$ is pivoted at one side to the main frame to turn on a horizontal axis, and by so pivoting the mold its position may be reversed—as, for instance, when occupying the full-line position, Fig. 3, it is adapted to receive the plastic material to be molded, and when swung on its pivotal connections, and thereby turned upside down, as indicated by dotted lines, it is adapted to discharge the molded blocks.

When the mold is in upright position, as shown in Fig. 2, the bottom plate $c'$ is supported by the nut $c^3$ on the screw-threaded portion of the rod $c^2$ bearing upon the yoke $c^4$, and when the mold is turned on its pivotal connection into the position shown by dotted lines, Fig. 3, said bottom plate falls by gravity.

The bottom plate $c'$ and parts attached thereto are quite heavy, so that when the mold is turned upside down and said parts fall by gravity the molded blocks will be automatically discharged.

The space in which the material is placed to be formed into blocks is regulated by adjustment of the bottom plate $c'$ to different elevations, which may be effected by the nut $c^3$.

A wire $d$ is attached to the upright portion $a'$ of the main frame or to any suitable fixed point which is made long enough to extend over and across the mold c, and it has at its outer or free end a handpiece d', by which it may be manipulated. The wire d is operated to cut off the surplus material projecting above the top of the mold by drawing it taut, as represented by dotted lines, Fig. 2, and sweeping it across the top of the mold.

In operating the machine the plastic material is placed in the mold. Then the hand-lever $a^2$ is depressed and the plunger borne by it thrust upon the material contained in the mold, pressing it as much as desired. Then said hand-lever is raised and the surplus material is cut off by the wire d and removed by any suitable tool, and then the mold is turned upside down on its horizontal pivots and the molded blocks automatically discharged.

In case the material has a tendency to spatter when being pressed by the plunger I may provide a hood e on the hand-lever, which is composed of several flat strips joined together to form a hollow square surrounding the plunger b and projecting beyond the face of said plunger, and said hood is made large enough to also inclose the mold c when the hand-lever is depressed. This hood confines all flying particles.

I claim—

1. In a machine for molding plastic materials, a mold pivoted at one side to turn on a horizontal axis, enabling its position to be reversed, and having as a coöperative part of it a bottom plate which slides bodily to discharge the molded blocks, and an adjusting device for said bottom plate whereby its position in the mold may be varied which also serves as a support for said bottom plate during the molding operation, substantially as described.

2. In a machine for molding plastic materials, a mold pivoted at one side to turn on a horizontal axis, enabling its position to be reversed and having as a coöperative part of it a gravitating bottom plate moving bodily in both directions according as the position of the mold is changed, substantially as described.

3. In a machine for molding plastic materials, a mold pivoted at one side to turn on a horizontal axis enabling its position to be reversed, and having as a coöperative part of it a gravitating bottom plate moving bodily in both directions according as the position of the mold is changed and an adjusting device for supporting said bottom plate in adjusted positions during the molding operations and a stop for limiting the movement of said bottom plate during the discharging operation, substantially as described.

4. In a machine for molding plastic materials, a mold pivoted at one side to turn on a horizontal axis, whereby its position may be reversed, and having as a coöperative part of it a bottom plate having fixed to it a screw-threaded rod with a nut thereon, and a yoke having a hole through it through which said rod freely slides, and a weighted end piece on the end of said rod, substantially as described.

In testimony whereof I have signed my name to this specification in the presence of two subscribing witnesses.

WINFIELD S. QUINBY.

Witnesses:
B. J. NOYES,
J. L. HUTCHINSON.